(12) United States Patent
Liu

(10) Patent No.: US 10,048,829 B2
(45) Date of Patent: Aug. 14, 2018

(54) METHOD FOR DISPLAYING ICONS AND ELECTRONIC APPARATUS

(71) Applicant: Lenovo (Beijing) Co., Ltd., Beijing (CN)

(72) Inventor: Jiacheng Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 282 days.

(21) Appl. No.: 14/840,446

(22) Filed: Aug. 31, 2015

(65) Prior Publication Data

US 2016/0378299 A1 Dec. 29, 2016

(30) Foreign Application Priority Data

Jun. 26, 2015 (CN) .......................... 2015 1 0364537
Jun. 26, 2015 (CN) .......................... 2015 1 0364540

(51) Int. Cl.
*G06F 3/0481* (2013.01)
*G06F 3/0488* (2013.01)

(52) U.S. Cl.
CPC ...... *G06F 3/04817* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 5,442,795 A * | 8/1995 | Levine | ..................... | G06F 3/033 715/234 |
| 5,760,774 A * | 6/1998 | Grossman | ............. | G06F 3/0481 715/835 |
| 7,600,192 B1 * | 10/2009 | Hashimoto | ........... | G06F 3/0482 715/716 |
| 7,873,906 B2 * | 1/2011 | Womack | .................. | G09B 7/02 705/14.73 |
| 8,266,550 B1 * | 9/2012 | Cleron | .................. | G06F 1/1633 345/173 |
| 8,754,911 B2 * | 6/2014 | Kim | ...................... | G06F 3/0416 345/156 |
| 2005/0210417 A1 * | 9/2005 | Marvit | .................. | G06F 1/1613 715/863 |
| 2006/0156228 A1 * | 7/2006 | Gallo | .................... | G06F 3/0481 715/202 |
| 2006/0190833 A1 * | 8/2006 | SanGiovanni | ...... | G06F 3/04883 715/767 |
| 2008/0189658 A1 * | 8/2008 | Jeong | .................... | G06F 3/0482 715/810 |
| 2008/0220751 A1 * | 9/2008 | De Bast | ................ | G06F 3/0338 455/414.2 |

(Continued)

OTHER PUBLICATIONS

First German Office Action regarding Application No. 102015218476.5 dated Feb. 17, 2016. English translation provided by Unitalen Attorneys at Law.

*Primary Examiner* — Yongjia Pan
(74) *Attorney, Agent, or Firm* — Harness, Dickey & Pierce, P.L.C.

(57) ABSTRACT

A method for displaying icons and an electronic apparatus are provided. The method includes: determining N icons which have a one-to-one correspondence with N applications of an electronic apparatus, where $N \geq 1$, each of the N icons has a first display parameter; acquiring a sensing parameter by a sensor of the electronic apparatus; determining whether the sensing parameter matches with a preset operation; and adjusting the first display parameter of at least one of the N icons if the sensing parameter matches with the preset operation.

20 Claims, 10 Drawing Sheets

(56) References Cited

U.S. PATENT DOCUMENTS

| | | |
|---|---|---|
| 2009/0058821 A1 | 3/2009 | Chaudhri et al. |
| 2011/0161870 A1* | 6/2011 | Muller .................. G06F 3/0481 |
| | | 715/800 |
| 2011/0252346 A1* | 10/2011 | Chaudhri ............ G06F 3/04817 |
| | | 715/765 |
| 2012/0192110 A1 | 7/2012 | Wu |
| 2012/0192111 A1* | 7/2012 | Hsu .................... G06F 3/04817 |
| | | 715/821 |
| 2013/0014052 A1* | 1/2013 | Frey ...................... G06F 3/0485 |
| | | 715/800 |
| 2013/0067398 A1* | 3/2013 | Pittappilly ............ G06F 3/0482 |
| | | 715/800 |
| 2013/0135234 A1 | 5/2013 | Hisano et al. |
| 2013/0268875 A1* | 10/2013 | Han ...................... G06F 3/0481 |
| | | 715/769 |
| 2014/0201681 A1* | 7/2014 | Mahaffey .......... H04M 1/72569 |
| | | 715/846 |
| 2015/0121298 A1* | 4/2015 | Ma ........................ G06F 3/0488 |
| | | 715/784 |
| 2015/0205486 A1* | 7/2015 | Ohbitsu .............. G06F 3/04817 |
| | | 715/801 |

\* cited by examiner

METHOD FOR DISPLAYING ICONS AND ELECTRONIC APPARATUS

This application claims priority to Chinese Patent Application No. 201510364540.2, filed on Jun. 26, 2015, and Chinese Patent Application No. 201510364537.0, filed on Jun. 26, 2015, both of which are hereby incorporated by reference in their entireties.

FIELD

The disclosure relates to the technical field of electronic technology, and in particular to a method for displaying icons and an electronic apparatus.

BACKGROUND

With the development of information processing technology, electronic apparatuses such as mobile phones, tablets and laptops get more and more popular in people's working and daily life. Generally, various applications are setup on the electronic apparatuses to facilitate the usage of the electronic apparatus.

A desktop of the electronic apparatus is mainly used to display icons of these applications, so as to find a certain icon and launch a corresponding application. Currently, icons are commonly displayed on the desktop in a traditional matrix or list. Meanwhile, in the case that multiple applications are installed on the electronic apparatus, icons of multiple applications may be arranged in a folder and the folder may be displayed. Alternatively, icons of multiple applications may be displayed by being distributed on multiple pages.

With the development of third-party applications, more and more applications are installed on the electronic apparatus, which leads to an increasing number of icons of applications on the screen of the electronic apparatus. A current icon display method is unable to meet the user's demand to look for applications rapidly. For example, in a case that the user need to invoke an application urgently, it is not convenient for him/her to quickly locate the icon corresponding to the application to be invoked from multiple icons of applications on the screen, which may lead to a poor user experience. In addition, icons are not displayed intuitively. The user has to open multiple folders or turn multiple pages to find the application to be invoked, which is inconvenient and may lead to a low usage efficiency of the electronic apparatus.

SUMMARY

A method for displaying icons is provided according to embodiments of the disclosure, the method includes:
  determining N icons displayed on a display screen of an electronic apparatus, where the N icons have a one-to-one correspondence with N applications of the electronic apparatus, where N≥1, each of the N icons has a first display parameter;
  acquiring a sensing parameter by a sensor of the electronic apparatus;
  determining whether the sensing parameter matches with a preset operation; and
  adjusting the first display parameter of at least one of the N icons in a case that the sensing parameter matches with the preset operation.
  Optionally, before acquiring a sensing parameter by a sensor of the electronic apparatus, the method may further include: controlling the display screen of the electronic apparatus to display n icons, where 1<n<N; each of the n icons is operative to invoke a corresponding application in response to a triggering operation; and
  the adjusting the first display parameter of at least one of the N icons may include:
    adjusting first display parameters of m icons, where the m icons includes the n icons, where n<m≤N; and
    displaying the adjusted m icons on the display screen.
  Optionally, the first display parameter may be a size of an icon, and the adjusting first display parameters of m icons may include:
    adjusting each of the m icons from a first size to a second size, where the second size is smaller than the first size.
  Optionally, after adjusting first display parameters of m icons, the method may further include:
    adjusting display distance between any two adjacent icons of the m icons from a first display distance to a second display distance, where the second display distance is shorter than the first display distance.
  Optionally, the adjusting first display parameters of m icons may include:
    determining whether the m icons include a folder; and
    disabling the folder, and displaying icons corresponding to applications in the folder on the display screen, in a case that the m icons include the folder.
  Optionally, each of the N icon may further include a second display parameter, and after the adjusting first display parameters of m icons, the method may further include:
    ordering m icons based on the second display parameter.
  Optionally, the preset operation may be a triggering operation, and
  after the adjusting the first display parameter of at least one of the N icons, the method may further include:
    invoking an application corresponding to the adjusted at least one of the N icons, in response to the triggering operation.
  Optionally, the determining whether a preset operation is performed based on the sensing parameter may include:
    detecting a triggering operation on a target display icon of the N icons displayed in a second display interface, in a case that a display state of the N icons is switched from a first display state to a second display state;
    where in the first display state, the N icons are displayed in a first display interface which includes multiple display content pages, where each of the multiple display content pages includes at least one of the N icons, the total number of icons in the multiple display content pages is N, where N is an integer greater than or equal to 2; in the second display state, the N icons are displayed in the second display interface which includes single display content page, where the single display content page includes the N icons, and an icon displayed in the first display interface has a display parameter different from an icon displayed in the second display interface.
  Optionally, the adjusting the first display parameter of at least one of the N icons may include:
    enlarging the target display icon, where an area of a display region occupied by the enlarged target display icon is larger than an area of a display region occupied by an display icon corresponding to any one of other applications in a first display content page including the target display icon; and the multiple display content pages include the first display content page.
  Optionally, the adjusting the first display parameter of at least one of the N icons may include:

adjusting a display color of the target display icon, where a color of the adjusted target display icon is different from a color of an icon corresponding to any one of other applications in a first display content page including the target display icon; and the multiple display content pages include the first display content page.

Optionally, the adjusting the first display parameter of at least one of the N icons may include:

switching the target display icon to a blinking display state, where the adjusted target display icon has a display state different from an icon corresponding to any one of other applications in a first display content page including the target display icon, and the multiple display content pages include the first display content page.

Optionally, after the adjusting the first display parameter of at least one of the N icons, the method may further include:

determining a first display content page including the target display icon, and obscuring display contents except the target display icon in the first display content page.

Optionally, the invoking an application corresponding to the adjusted at least one of the N icons in response to the triggering operation may include:

switching the electronic apparatus to the first display state;

displaying the first display content page including the target display icon in the first display interface and invoking a target application in response to the triggering operation after the target display icon is displayed in the adjusted display state for a preset time period.

An electronic apparatus is provided according to an embodiment of the disclosure. The electronic apparatus includes:

a housing;

a display screen disposed at a first position of the housing;

a sensor;

a memory configured to store at least one program module;

at least one processor connected with the display screen and the sensor, where the at least on processor is configured to:

determine N icons displayed on the display screen of the electronic apparatus, where the N icons have a one-to-one correspondence with N applications of the electronic apparatus, where N≥1, each of the N icons has a first display parameter;

determine whether a sensing parameter acquired by the sensor matches with a preset operation; and adjust the first display parameter of at least one of the N icons in a case that the sensing parameter matches with the preset operation.

Optionally, the at least one processor may be further configured to: control the display screen to display n icons before the sensing parameter is acquired by the sensor, where 1<n<N; and each of the n icons is operative to invoke a corresponding application in response to a triggering operation for the icon;

adjust first display parameters of m icons, where the m icons includes the n icons, where n<m≤N; and display the adjusted m icons on the display screen.

Optionally, the first display parameter may be a size of an icon, and the at least one processor may be configured to:

adjust each of the m icons from a first size to a second size, where the second size is smaller than the first size.

Optionally, the at least one processor may be further configured to:

adjust a display distance between any two adjacent icons of the m icons from a first display distance to a second display distance, where the second display distance is shorter than the first display distance.

Optionally, the at least one processor may be further configured to:

determine whether the m icons include a folder; and disable the folder, and display icons corresponding to applications in the folder on the display screen, in a case that the m icons include the folder.

Optionally, each of the N icon may further include a second display parameter, and the at least one processor may be further configured to:

order m icons based on the second display parameter.

Optionally, the preset operation may a triggering operation, and after adjusting the first display parameter of at least one of the N icons, the at least one processor may be further configured to:

invoke an application corresponds to the adjusted at least one of the N icons in response to the triggering operation.

Optionally, the at least one processor is further configured to:

detect a triggering operation on a target display icon of the N icons displayed in a second display interface, in a case that a display state of the N icons is switched from a first display state to a second display state;

where in the first display state, the N icons are displayed in a first display interface which includes multiple display content pages, where each of the multiple display content pages includes at least one of the N icons, the total number of icons in the multiple display content pages is N, where N is an integer greater than or equal to 2; in the second display state, the N icons are displayed in the second display interface which includes single display content page, where the single display content page includes the N icons, and an icon displayed on the first display interface has a display parameter different from an icon displayed on the second display interface.

Optionally, the at least on processor is further configured to:

enlarge the target display icon, where an area of a display region occupied by the enlarged target display icon is larger than an area of a display region occupied by an display icon corresponding to any one of other applications, in a first display content page including the target display icon; and the multiple display content pages include the first display content page.

Optionally, the at least on processor is further configured to:

adjust a display color of the target display icon, where a color of the adjusted target display icon is different from a color of an icon corresponding to any one of other applications in a first display content page including the target display icon; and the multiple display content pages include the first display content page.

Optionally, the at least on processor is further configured to:

switch the target display icon to a blinking display state, where the adjusted target display icon has a display state different from an icon corresponding to any one of other applications, in a first display content page including the target display icon, and the multiple display content pages include the first display content page.

Optionally, after adjusting the first display parameter of at least one of the N icons, the at least one processor may be further configured to:

determine a first display content page including the target display icon, and obscure display contents except the target display icon in the first display content page.

Optionally, the at least on processor is further configured to:

switch the electronic apparatus to the first display state;

display the first display content page including the target display icon in the first display interface; and invoke a target application in response to the triggering operation after the target display icon is displayed in the adjusted display state for a preset time period.

BRIEF DESCRIPTION OF THE DRAWINGS

The drawings to be used in the description of embodiments are described briefly as follows, to clarify technical solutions according to the embodiments of the present disclosure. It is obvious that the drawings in the following description only illustrate some embodiments of the present disclosure. For those skilled in the art, other drawings may be obtained based on these drawings without any creative work.

DETAILED DESCRIPTION OF EMBODIMENTS

A method for displaying icons and an electronic apparatus are provided according to embodiments of the disclosure to solve the technical issue in the conventional art that a singular icon display mode of the electronic apparatus may lead to the low usage efficiency of the electronic apparatus.

According to an embodiment of the disclosure, a method for displaying icons includes: determining N icons displayed on a display screen of an electronic apparatus, where the N icons have a one-to-one correspondence with N applications of the electronic apparatus, where N≥1, and each of the N icons has a first display parameter; acquiring a sensing parameter by a sensor of the electronic apparatus; determining whether the sensing parameter matches with a preset operation; and adjusting the first display parameter of at least one of the N icons in a case that the sensing parameter matches with the preset operation.

In this way, after the first display parameter of icons is adjusted, the electronic apparatus displays at least one of the N adjusted icons on the display screen. Therefore, the user may look for the target display icon conveniently from the display screen on which the adjusted icons are displayed, and thus usage efficiency of the electronic apparatus may be enhanced.

Technical solutions according to embodiments of the present disclosure are described clearly and completely hereinafter in conjunction with the drawings. It is obvious that the described embodiments are only a part rather than all of the embodiments according to the present disclosure. Any other embodiments obtained by those skilled in the art based on the embodiments in the present disclosure without any creative work fall in the scope of the present disclosure.

First Embodiment

Figure 1:
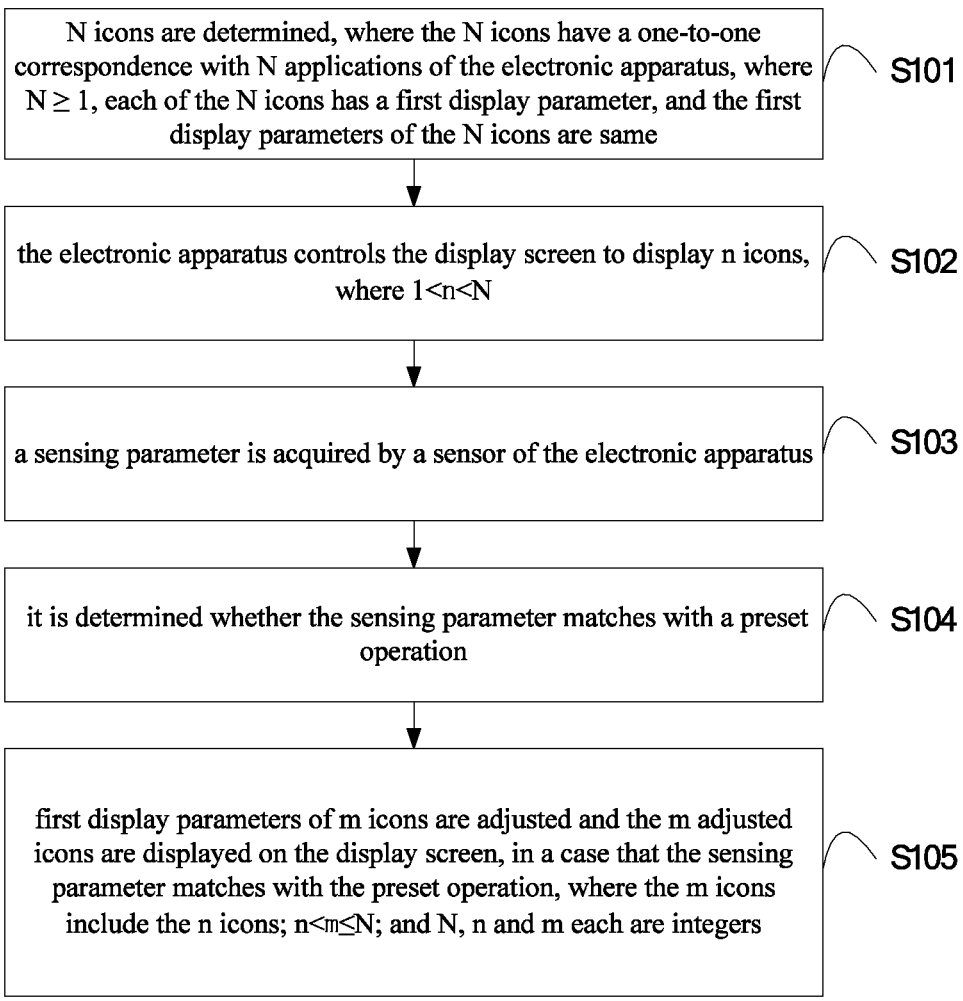
FIG. 1 is a flow chart of a method for displaying icons according to an embodiment of the disclosure.

FIG. 1 is a flow chart of a method for displaying icons according to an embodiment of the disclosure. The method is applied to an electronic apparatus, and includes the following steps S101 to S105.

In step S101, N icons are determined, where the N icons have a one-to-one correspondence with N applications of the electronic apparatus, where N≥1, each of the N icons has a first display parameter, and the first display parameters of the N icons are same.

For example, the first display parameter may be a size of the icon or an area of the icon. Thus, the N icons have the same size, and the areas occupied by the respective icons on the display screen of the electronic apparatus are same.

In step S102, the electronic apparatus controls the display screen to display n icons, where 1<n<N.

Particularly, applications corresponding to the n icons may be invoked in response to the triggering operation for the corresponding icon.

It should be noted that, the electronic apparatus may display the N-n icons, other than the n icons, on the display screen in response to a page-turning operation of the operator. For the user perception, multiple display pages seems to be displayed on the display screen of the electronic apparatus, where n icons are displayed on one page and the N-n icons are displayed on the other page.

In step S103, a sensing parameter is acquired by a sensor of the electronic apparatus.

In step S104, it is determined whether the sensing parameter matches with a preset operation.

In step S105, first display parameters of m icons are adjusted and the m adjusted icons are displayed on the display screen, in a case that the sensing parameter matches with the preset operation, where the m icons include the n icons; n<m≤N; and N, n and m each are integers.

Particularly, an application corresponding to one of the m adjusted icons is invoked in response to a triggering operation for the corresponding icon.

In a possible implementation of the embodiments of the disclosure, the first display parameter may be a size of the icon. In step S105, the adjusting first display parameters of m icons may include:

adjusting each of the m icons from the first size to a second size, where the second size is smaller than the first size.

Particularly, according to an embodiment of the disclosure, the size of icon may be reduced to display more icons on the display screen of the electronic apparatus, and thus the user may look for icons more conveniently. For example, as shown in 2a of FIG. 2, before the electronic apparatus determines that the preset operation is performed, icons of 4 applications, Phone, Message, WeChat and Weibo, are displayed on the display screen of the electronic apparatus, that is, n=4. The icons of the 4 applications are displayed on the display screen in a first size. As shown in 2b of FIG. 2, after the electronic apparatus determines that the preset operation is performed, icons of 6 applications, Phone, Message, WeChat, Weibo, Weather, Video, are displayed on the display screen of the electronic apparatus, that is, m=6. The icons of the 6 applications are scaled down from the first size to a second size. In this way, the display screen of the electronic apparatus may display more icons by reducing the size of icons, thus the icons may be displayed more intuitively, the user may look for icons more conveniently and usage efficiency of the electronic apparatus is enhanced.

It should be noted that, in the above example, the number N of the applications included in the electronic apparatus may be equal to 6. That is, after the preset operation is performed, the electronic apparatus adjusts icons of all applications and display the adjusted icons on the display screen, thus the user may find icons of all applications directly on the display screen. In the existing technology, before the preset operation is performed, the user needs to trigger a page-turning operation to display icons of applications Weather and Video on the display screen in response to the page-turning operation, when the user looks for the icons of applications Weather and Video. Compared with the existing technology, the user does not need to perform the page-turning operation, and may find icons more conveniently.

In the case that the number N of the applications included in the electronic apparatus is greater than 6, the electronic apparatus may control the display screen to display different icons in response to the page-turning operation of the operator. For example, in the case of N=12, the electronic apparatus may control the display screen to display 4 icons initially. Then, the electronic apparatus may control the display screen to display other 4 icons in response to a first page-turning operation of the operator, and controlled the display screen to display the last 4 icons in response to a second page-turning operation of the operator. According to the embodiment, by performing the above steps S101 to S105, after the preset operation is performed, the first display parameters of 6 icons may be adjusted, and 6 adjusted icons may be displayed on the display screen.

Further, the first display parameters of another 6 icons may also be adjusted. In this way, the electronic apparatus may display the adjusted another 6 icons on the display screen in response to the page-turning operation of the operator. Therefore, after the preset operation is performed, the user only needs to trigger the page-turning operation one times, icons of all applications may be checked, and thus the user may find icons more conveniently.

Figure 2:
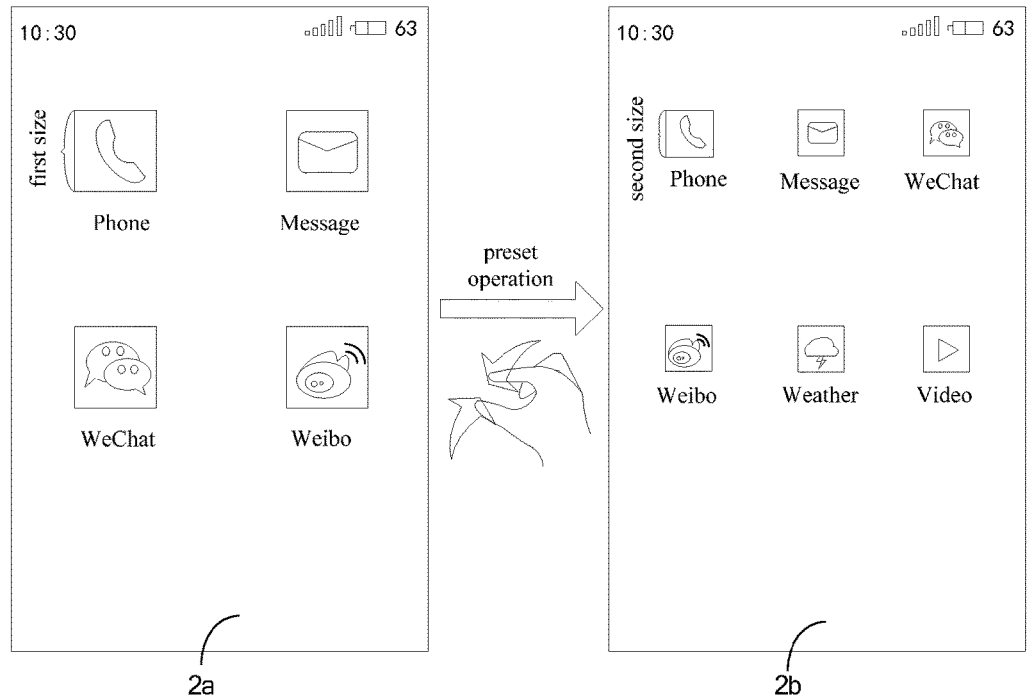
FIG. 2 is a schematic diagram of an icon display effect, where a size of an icon is adjusted, according to an embodiment of the disclosure.

Further, the preset operation may be a pinch operation performed by the operator on a touch screen. As shown in FIG. 2, the user performs the pinch operation with a thumb and an index finger. Thus, a sensing parameter sensed by a sensor, such as a capacitive touch sensor, of the electronic apparatus may include a first motion trajectory of the thumb of the user, a first touch point as an end point of the first motion trajectory, a second motion trajectory of the index finger of the user, and a second touch point as an end point of the second motion trajectory. The electronic apparatus determines whether the first motion trajectory and the second motion trajectory are continuous and whether the first touch point and the second touch point are the same point. It is determined that the sensing parameter meets a preset condition and the preset operation is performed, in the case that the first motion trajectory and the second motion trajectory are continuous and the first touch point and the second touch point are the same point. The above descriptions are only examples. Those skilled in the art may understand that the preset operation may also be performances of other gestures such as two fingers sliding over the screen or double-click on the screen, which will not be limited in the embodiments of the disclosure.

In the above description, a case that the first display parameter is the size of the icon is taken as an example for illustration. Optionally, the first display parameter may be an area of the icon. According to the embodiments of the disclosure, the number of icons displayed on the display screen may be increased by reducing the area of the icon, which will not be omitted herein. Other first display parameters that can be imagined by those skilled in the art based on the logical guidance of embodiments of the disclosure fall in the scope of the present disclosure, which will not enumerated herein.

In another possible implementation of the embodiment of the disclosure, after first display parameters of m icons are adjusted, a display distance between any two adjacent icons of the m icons may also be adjusted from a first display distance to a second display distance, where the second display distance is shorter than the first display distance.

Particularly, the display distance between icons may be reduced to display more icons on the first display interface, and thus the user may look for icons conveniently. For example, as shown in 3a of FIG. 3, before the electronic apparatus determines that the preset operation is performed, 4 icons of applications, Phone, Message, WeChat and Weibo, are displayed on the display screen of the electronic apparatus, that is, n=4. The distance between any two adjacent icons of the 4 icons of applications is the first display distance. As shown in 3b of FIG. 3, after the electronic apparatus determines that the preset operation is performed, icons of 6 applications, Phone, Message, WeChat, Weibo, Weather, Video, are displayed on the display screen. The distance between any two adjacent icons of the 6 icons of applications is reduced from the first display distance to the second display distance. In this way, more icons may be displayed on the display screen of the electronic apparatus by reducing the display distance between icons, and thus the user may find icons conveniently.

Figure 3:
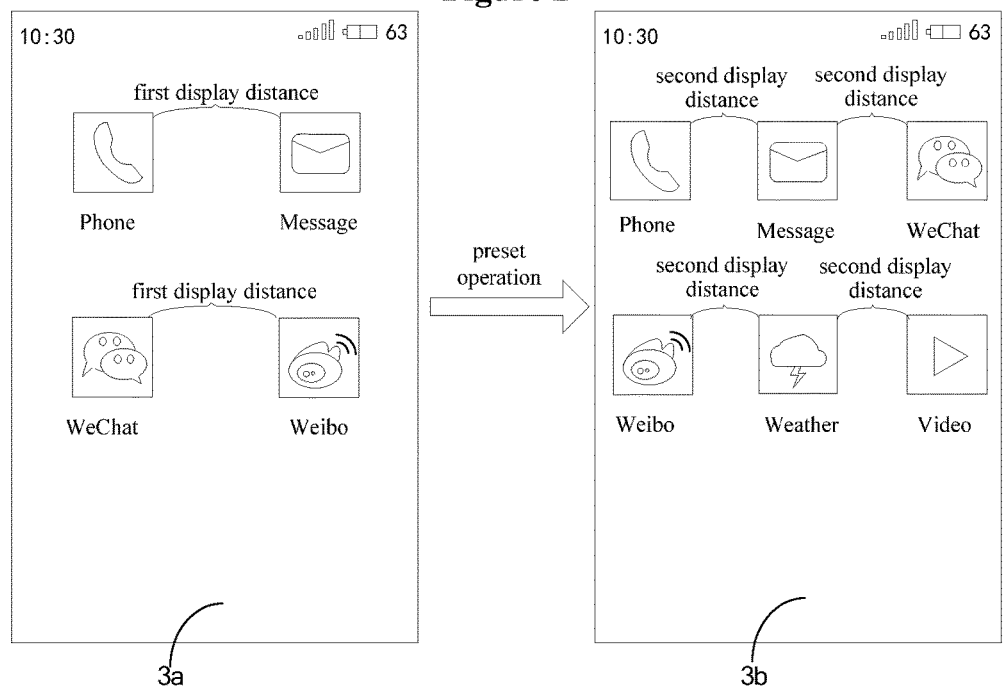
FIG. 3 is a schematic diagram of an icon display effect, where a display distance between any two adjacent icons is adjusted, according to an embodiment of the disclosure.

The above description is only an example. FIG. 3 only illustrates the case that a horizontal display distance between any two adjacent icons is reduced. However, during the specific implementation, a vertical display distance between any two adjacent icons may be reduced simultaneously.

Further, in an implementation of according to the embodiment of the disclosure, the size of the icons and the display distance between any two adjacent icons may be reduced simultaneously.

Further, it should be noted that, a folder icon, which includes at least one icon grouped into one folder, may be displayed on the display screen of the electronic apparatus. In this case, when the user looks for the icon belonging to the folder, the user should find the folder icon, trigger the electronic apparatus to display icons in the folder, and look for the icon of the application to be invoked. According to the embodiments of the disclosure, to simplify the user operation, the display screen may be controlled to display icons in the folder directly. Particularly, in step S105, the adjusting first display parameters of m icons includes: determining whether the m icons include a folder; and disabling the folder in a case that the m icons include the folder. Thus, the m icons do not include the folder icon.

Figure 4:
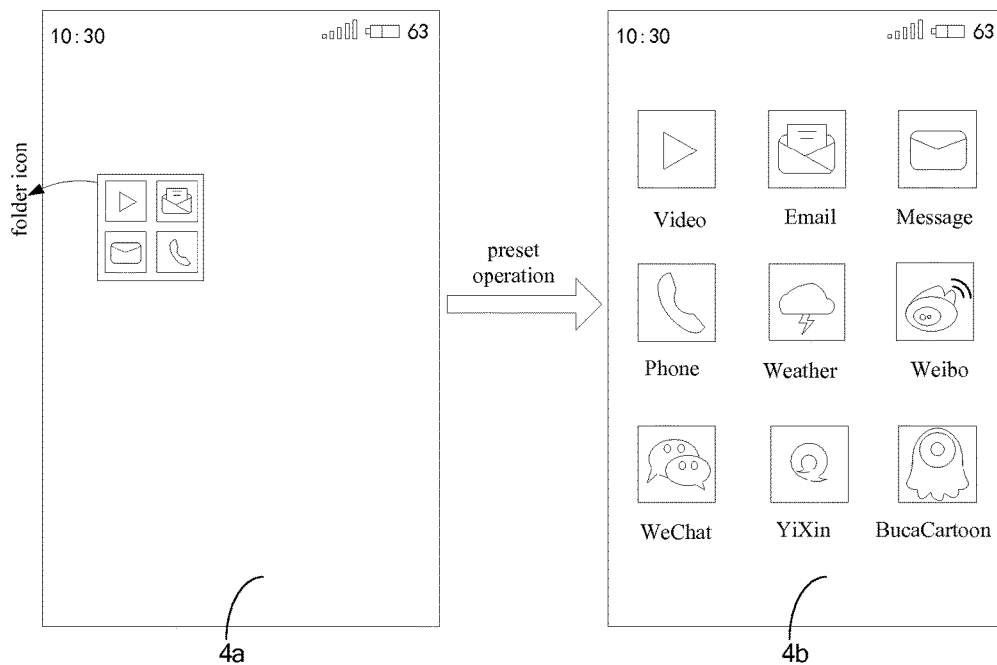
FIG. 4 is a schematic diagram of an icon display effect, where a folder icon is adjusted, according to an embodiment of the disclosure.

For example, as shown in 4a of FIG. 4, before the preset operation is performed, a folder icon is displayed on the display screen of the electronic apparatus, and the folder corresponding to the folder icon includes 4 icons of applications, Phone, Message, WeChat and Weibo. As shown in 4b of FIG. 4, after the electronic apparatus determines that the preset operation is performed, the electronic apparatus disable the folder, and thus all of the 4 icons of applications, Phone, Message, WeChat and Weibo, are displayed on the display screen directly. The user does not need to open the folder when looking for the icon. Thus, the icons may be found more conveniently.

It should be noted that, after the user finds the icon and triggers the application corresponding to the icon, the folder may be reenabled by the electronic apparatus. Alternatively, after the electronic apparatus displays the m adjusted icons on the display screen, the user may trigger the electronic apparatus to display the n icons on the display screen again, and the electronic apparatus may be reenable the folder simultaneously, thereby displaying the folder icon on the display screen.

Further, in a possible implementation according to the embodiment of the disclosure, after first display parameters of m icons are adjusted, m icons are ordered based on the second display parameters of m icons, where the m icons have different second display parameters.

It should be noted that, when looking for an application on the display screen of the electronic apparatus, the user habitually looks for an application according to a color or a shape of the icon of the application. Thus, the second display parameter may be a color of an icon or a shape of an icon. In this case, according to the embodiment of the disclosure, the m icons may be ordered based on the different colors of the m icons or based on the different shapes of the m icons.

Figure 5:
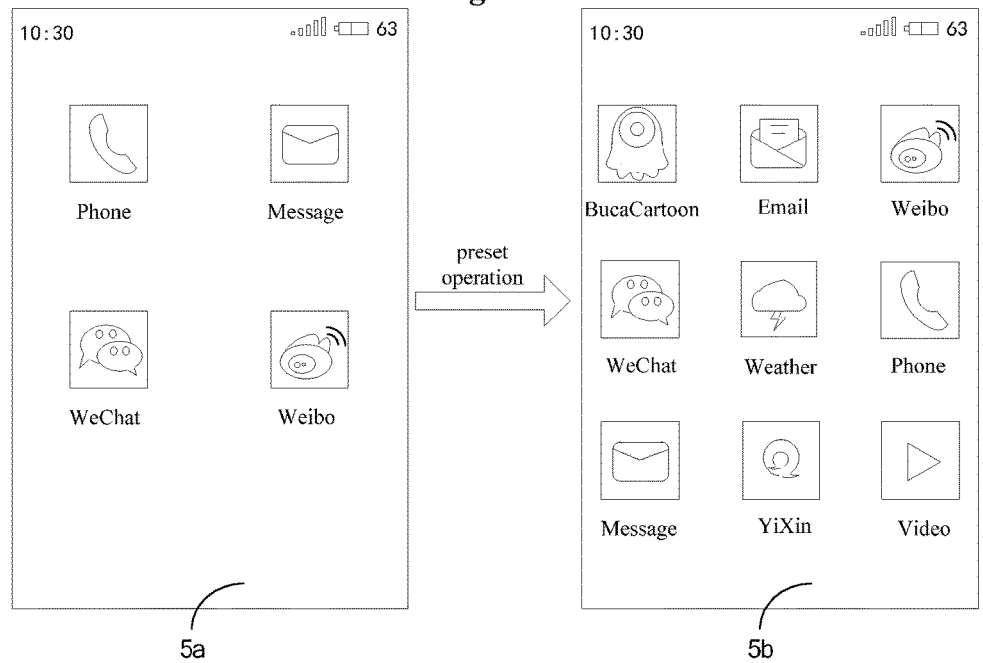
FIG. 5 is a schematic diagram of an icon display effect, where an icon arrangement is adjusted, according to an embodiment of the disclosure.

For example, the electronic apparatus may include applications with yellow icons such as BucaCartoon, Mail and Weibo, applications with green icons such as WeChat, Weather and Phone, applications with white icons such as Message, YiXin and Video. As shown in 5a of FIG. 5, before the electronic apparatus determines that the preset operation is performed, icons of 4 applications, Phone, Message, WeChat and Weibo, are displayed in sequence on the display screen of the electronic apparatus. As shown in 5b of FIG. 5, after the electronic apparatus determines that the preset operation is performed, 9 icons, Phone, message, WeChat, Weibo, Weather, Video, BucaCartoon, Mail and YiXin are ordered based on colors of icons. The yellow icons, corresponding to BucaCartoon, Mail and Weibo, are close to each other; the green icons, corresponding to WeChat, Weather, and Phone, are close to each other; and the white icons, corresponding to Message, YiXin and Video, are close to each other. Thus, icons are displayed more intuitively. In this way, when looking for Weibo, the user may look for the icon among yellow icons, so as to find the icon more conveniently.

In the above description, a case that the second display parameter is the color of the icon is taken as an example for illustration. However, the second display parameters may be other display parameters which may distinguish icons, such as a shape of an icon, which will not be enumerated herein. Other second display parameters that can be imagined by those skilled in the art based on the logical guidance of the embodiments of the disclosure fall in the scope of the present disclosure.

In another implementation according to the embodiment of the disclosure, after the first display parameters of the m icons are adjusted, display elements of m icons may further be hidden. The display element may include a word of each of the m icons, and the word may include a name of the application corresponding to the icon.

Particularly, according to an embodiment of the disclosure, when the user looks for the application, in order to avoid disturbances from other elements other than icons on the display interface of the electronic apparatus, display elements other than icons on the display screen of the electronic apparatus may be hidden after the preset operation is performed.

Figure 6:
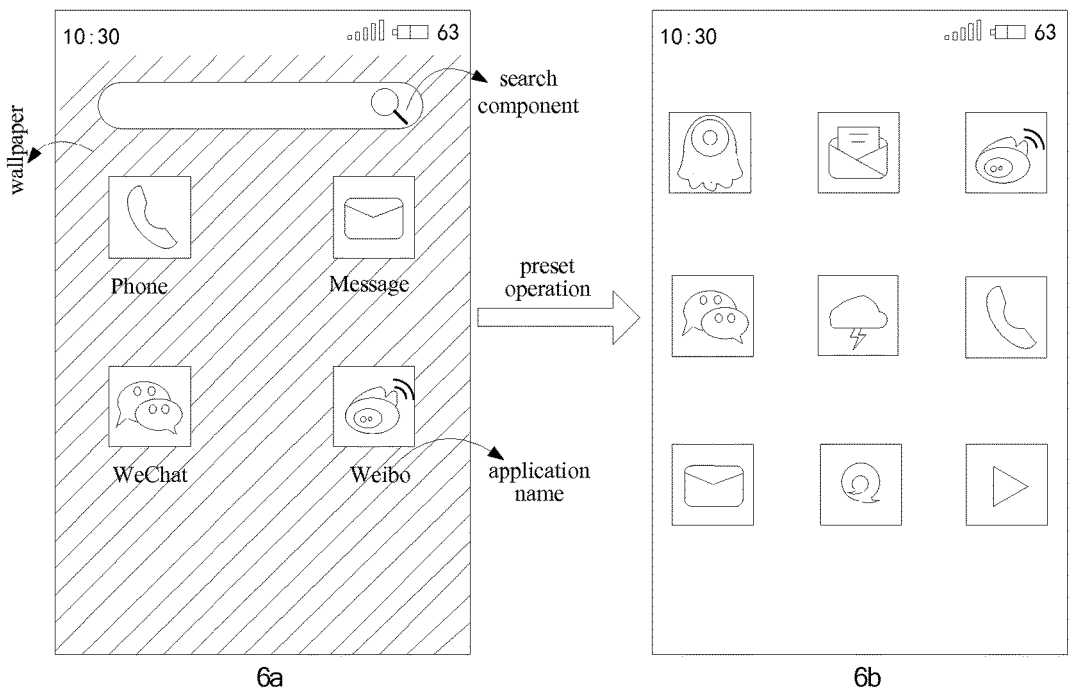
FIG. 6 is a schematic diagram of an icon display effect, where a display element of an icon is hidden, according to an embodiment of the disclosure.

For example, as shown in 6a of FIG. 6, before the electronic apparatus determines that the preset operation is performed, 4 applications, Phone, Message, WeChat and Weibo, are displayed on the display screen of the electronic apparatus. In addition, a wallpaper, application names corresponding to icons, and a search component for searching information are also displayed on the display screen. As shown in 6b of FIG. 6, after the electronic apparatus determines that the preset operation is performed, all of the wallpaper, the application names and the search component are hidden by the electronic apparatus, and only icons of applications are displayed on the display screen. Disturbances from irrelevant elements are avoided and icons may be displayed more intuitively, thus the user may find icons more conveniently.

The above description is only an example, and a part of display elements other than icons may be hidden by the electronic apparatus. For example, only words of each of icons and functional component are hidden on the display screen, and the wallpaper is displayed, which will not be limited in the disclosure.

Therefore, the electronic apparatus may start a browse display state in which more icons are displayed on the display screen. In a preferred implementation according to the embodiment of the disclosure, the electronic apparatus may control the display screen to display icons of all applications in the browse display state, thus the user may find the icon of the application to be invoked conveniently and rapidly, and usage efficiency of the electronic apparatus may be enhanced. Further, the electronic apparatus may also exit the browse display state and restore normal display in response to an operation of the user.

With the icon display method according to embodiments of the disclosure, N icons are determined, where an one-toone correspondence is between the N icons and N applications of an electronic apparatus, where N≥1; n icons are displayed on a display screen of the electronic apparatus, where 1<n<N, and a sensing parameter is acquired by a sensor of the electronic apparatus; whether a preset operation is performed is determined based on the sensing parameter; and first display parameters of m icons are adjusted in a case that it is determined that the preset operation is performed, and m adjusted icons are displayed on the display screen, where the m icons include the n icons, n<m≤N. In this way, after the electronic apparatus adjusts the first display parameter of icons, m icons including the n icons are displayed on the display screen. Therefore, the user may find other icons besides the n icons on the display screen. The user does not need to turn a page to look for icons, and thus usage efficiency of the electronic apparatus is enhanced.

Second Embodiment

In an implementation, the icon display method is applicable for an electronic apparatus. The electronic apparatus may be an electronic apparatus including a display screen, such as a mobile phone, a tablet, a laptop, or may be other types of electronic apparatus, which will not be enumerated herein.

Figure 7:
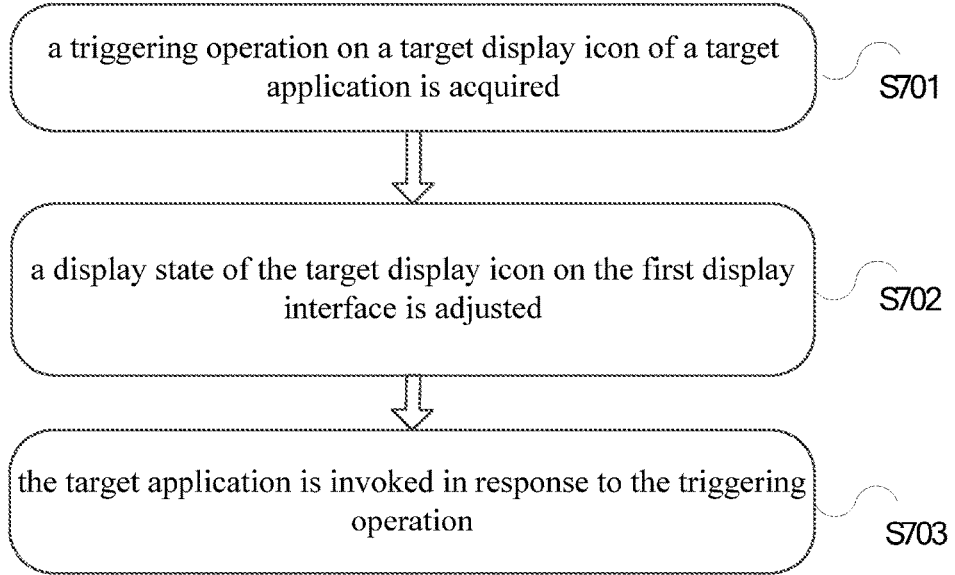
FIG. 7 is a flow chart of a method for displaying icons according to a second embodiment of the disclosure.

Referring to FIG. 7, a flow chart of a method for displaying icons according to a first embodiment of the disclosure is shown. The method includes the following steps S701 to S703.

In step S701, a triggering operation on a target display icon of a target application is acquired.

The specific implementation of step S701 may include the following two conditions.

In a first condition, the electronic apparatus invokes a function for searching local applications to obtain one of the local applications, and determines the obtained local application to be the target application. Thus, the acquired triggering operation is the operation for searching applications.

Particularly, according to the embodiment, the electronic apparatus has the function of searching local applications. When the user starts the search function, the user may enter retrieving information such as a name or a keyword of the application to be searched, into a search input box. After acquiring the retrieving information, the electronic apparatus may determine an application which matches with the retrieving information to be the target application. Thus, it can be determined that the triggering operation is the operation for searching an application.

In a second condition, N icons corresponding to N applications of the electronic apparatus is switched from a first display state to a second display state, a triggering operation on a target display icon in the N icons displayed on a second display interface is detected and acquired.

Particularly, in the first display state, the N icons are displayed in a first display interface which includes multiple display content pages, where each of the multiple display content pages includes at least one of the icons, the total number of icons in the multiple display content pages is N, where N is an integer greater than or equal to 2. In the second display state, N icons are displayed in the second display interface which includes single display content page, where the single display content page includes the N icons, and the display parameter of an icon displayed on the first display interface is different from the display parameter of the icon displayed on the second display interface.

Figure 8:
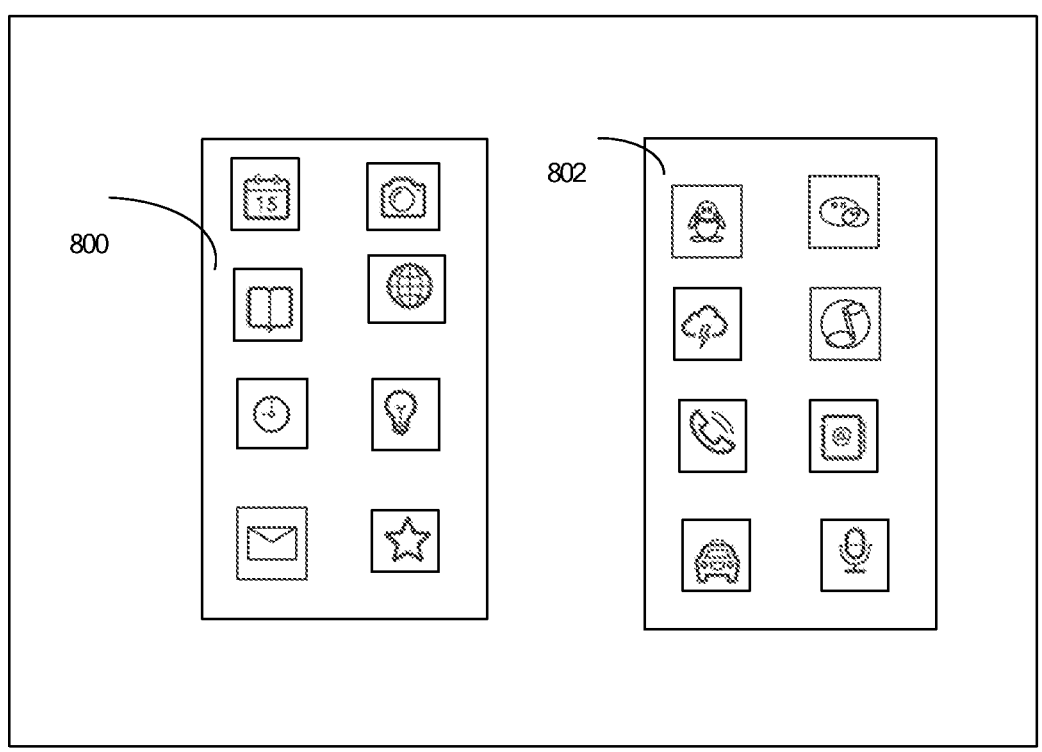
FIG. 8 is a schematic diagram of multiple display content pages in a first display state, in the icon display method according to the second embodiment of the disclosure.

Particularly, in the present embodiment, there are two display states in which icons of applications displayed on the display screen of the electronic apparatus. The first display state is a multiple display page state, where the electronic apparatus divides display icons corresponding to all of local applications into multiple display content pages, and each of the multiple display content pages include at least one display icon. For example, in the multiple display state, the first display interface of the electronic apparatus includes two display content pages. As shown in FIG. 8, icons corresponding to some of the applications of the electronic apparatus are displayed in the first display content page 81, and icons of the rest of the applications of the electronic apparatus are displayed in the second display content page 82. The total number of icons of applications displayed in the first display content page 81 and the second display content page 82 is equal to the number of icons corresponding to all of the applications included in the electronic apparatus. Either the first display content page 81 or the second display content page 82 can be displayed on the first display interface of a display unit of the electronic apparatus. The user may switch between display content pages by sliding the display screen. For example, the first display interface may be switched from the first display content page 81 to the second display content page 82, then an application may be invoked by clicking the icon corresponding to the application in the first display content page 81 or the second display content page 82 displayed on the first display interface.

Figure 9:
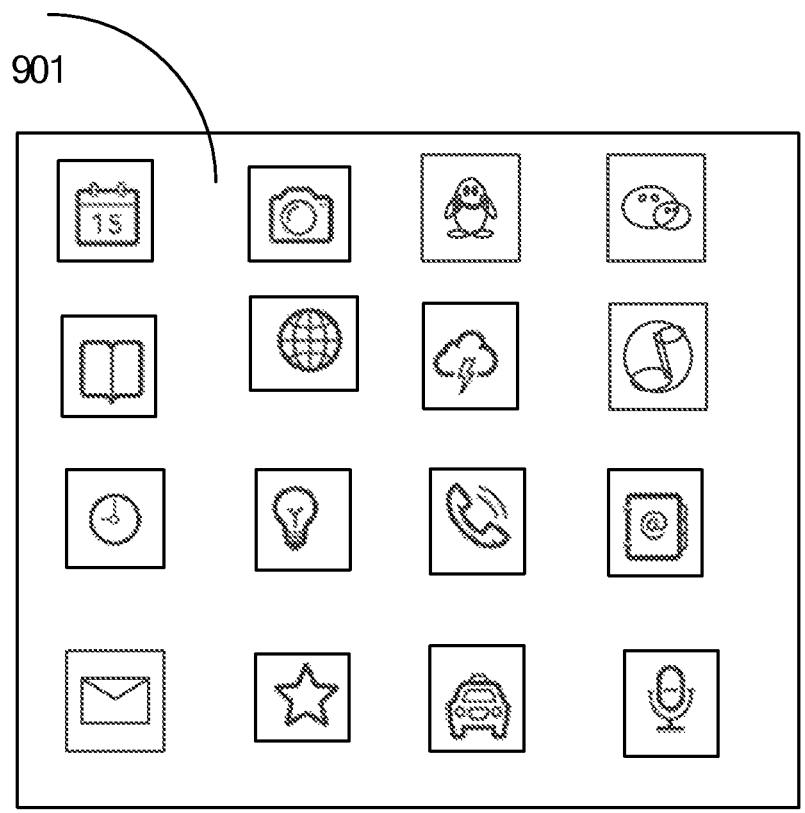
FIG. 9 is a schematic diagram of a global page in a second display state, in the icon display method according to the second embodiment of the disclosure.

The second display state is a global display state. Icons corresponding to all of the local applications are grouped into one global display content page by the electronic apparatus. As shown in FIG. 9, the electronic apparatus groups the icons of all of the local applications into one global display content page 91. The parameter of the display icon in the global display content page may be different from that in the multiple display content pages in the first display state. For example, an icon in the global display content page is smaller than an icon in the multiple display content pages, and the user may find icons corresponding to all of the local applications of the electronic apparatus on the global display content page without performing any switching operation. In the case of the display of single global display content page, the electronic apparatus still display the global display content page, rather than the switch of display contents when the user performs a sliding operation. Further, the user may launch an application by clicking the icon corresponding to the application in the global display content page displayed by the display unit.

A display state switch function of the display screen of the electronic apparatus may be triggered by a user operation on a state switch function button. For example, the electronic apparatus is provided with a button for switching a display state of the screen. The button may be a physical button or a virtual button. The display state of the display screen of the electronic apparatus may be switched when the user clicks or presses down the button. Alternatively, a function for switching the display state of the display screen may be provided in the electronic apparatus and an icon corresponding to the switching function is displayed on the display screen of the electronic apparatus. The display state of the display screen of the electronic apparatus may be switched when the user clicks the icon corresponding to the switching function. After the electronic apparatus is switched from the multiple display page state to the global display state, the electronic apparatus detects a click operation of the user on the icon of one of the applications in the global display contents displayed on the display unit, then determines the one of the applications to be the target application and acquires the click operation.

With the global display state, when the user needs to perform an operation on the target application, the electronic apparatus combines icons of all of the applications in the multiple display content pages into one global display content page. Instead of looking for the icon corresponding to the target application page by page in the electronic apparatus, the user may find the icon corresponding to the target application rapidly from the global display content page, thus the demand of the user for invoking the application rapidly is met.

In step S702, a display state of the target display icon on the first display interface is adjusted to prompt the user with the display position of the target display icon on the first display interface.

The display state of the target display icon corresponding to the target application may be adjusted in the following manners.

In a first manner, the target display icon is enlarged, thus an area of a display region occupied by the adjusted target display icon is larger than an area of a display region occupied by an display icon corresponding to any one of other applications in a first display content page which includes the target display icon, where the multiple display content pages include the first display content page.

Figure 10:
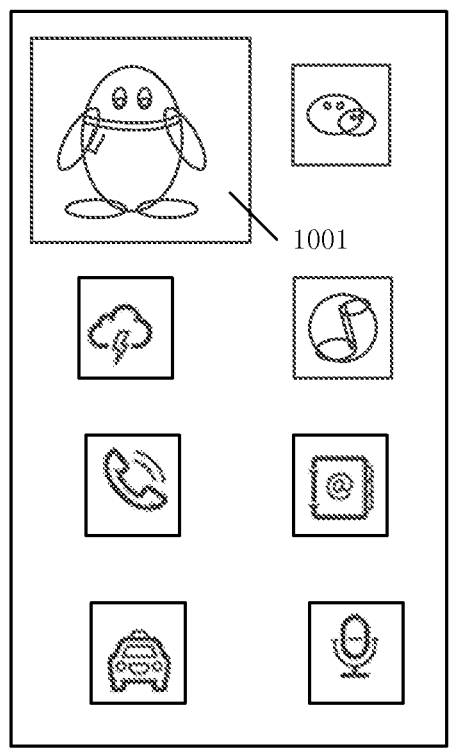
FIG. 10 is a schematic diagram of a target display icon which is enlarged with a first manner described in step S702, in the icon display method according to the second embodiment of the disclosure.

Particularly, in the embodiment, when the electronic apparatus determines the target application, the target display icon corresponding to the target application is enlarged at the initial position. For example, the icon may be enlarged by a preset scale, by taking a central point of an initial target display icon as the center. The preset scale may be 120%, 150%, and 200%. In an implementation, the preset scale may be set according to actual requirement, which will not be limited in the disclosure. After the target display icon is enlarged, the enlarged target display icon is displayed at the position where the initial target display icon was displayed. As shown in FIG. 10, the electronic apparatus determines that the target application is the QQ application, an initial display icon of the QQ application is acquired and a display position of the initial display icon is determined to be a first position on the first display content page of the first display interface. Then, the display icon of the QQ application may be enlarged to as much 150% of the initial display icon of the QQ application and the enlarged display icon of the QQ application may be displayed at the first position of the first display interface. In this case, an area of a display region occupied by the display icon 1001 of the QQ application is significantly larger than an area of a display region occupied by a display icon corresponding to any one of other application in a first display content page. In this way, the display icon of the QQ application is significantly larger than the display icon of any other applications, and thus the user may rapidly find the display icon of the QQ application, when the electronic apparatus is switched to display the first display content page.

In a second manner, a display color of the target display icon is adjusted, to distinguish a color of the adjusted target display icon from a color of an icon corresponding to any one of other applications in a first display content page including the target display icon, where the multiple display content pages include the first display content page.

Particularly, in the embodiment, the electronic apparatus determines the target application, adjusts the color of the target display icon corresponding to the target application. That is, the target display icon is adjusted to a preset color, where the preset color may be green, red, yellow or other colors. In an implementation, the preset color may be set according to actual requirement, which will not be limited herein. After the color of the target display icon is adjusted, the target display icon, the color of which is adjusted, is displayed at an initial position of the initial target display icon. For example, the electronic apparatus determines that the target application is the QQ application, acquires an initial display icon of the QQ application. A display position of the initial display icon is a first position on the first display content page of the first display interface. Then, the color of the initial display icon of the QQ application is adjusted to red and the adjusted display icon of the QQ application is displayed at the first position of the first display interface. In this case, the color of the display icon of the QQ application is significantly different from a color of a display icon corresponding to any one of other applications in a first display content page. Thus, the user may rapidly find the display icon of the QQ application when the electronic apparatus is switched to display the first display content page.

In a third manner, the target display icon is switched to a blinking display state, to distinguish a display state of the adjusted target display icon from a display state of an icon corresponding to any one of other applications in a first s display content page including the target display icon, where the multiple display content pages include the first display content page.

Particularly, in the embodiment, the electronic apparatus determines the target application, switches the target display icon corresponding to the target application from a static format to a blinking format. For example, the target display icon may be switched to a blinking image in Graphics Interchange Format (GIF) format. After the target display icon is switched to the blinking format, the target display icon, the display state of which is switched to blinking display state, is displayed at an initial position of the initial target display icon. For example, the electronic apparatus determines that the target application is the QQ application, acquires an initial display icon of the QQ application. The display position of the initial display icon is determined to be a first position on the first display content page of the first display interface. Then, the initial display icon of the QQ application is switched to GIF format, and the icon of the QQ application in GIF format is displayed at the first position of the first display interface. In this case, the display icon of the QQ application blinks at the first position of the first display interface, the display state of the display icon of the QQ application is significantly different from a display state of a display icon corresponding to any one of other applications in the first display content page. Thus, the user may find the display icon of the QQ application rapidly when the electronic apparatus is switched to display the first display content page.

In order to further highlight the position of the target display icon in the display screen, according to an embodiment of the disclosure, after step S702, the method further includes:

determining a first display content page including the target display icon, and obscuring display contents except the target display icon in the first display content page.

Particularly, in the embodiment, the electronic apparatus determines the target application, processes the display state of the target display icon corresponding to the target application with any one or more of the above three manners, and then acquires information of the first display content page including the target display icon. For example, information such as other display contents and a display background in the first display content page including the target display icon is acquired. After information on the first display content page is acquired, other regions except the region occupied by the target display icon are obscured in the first display content page. In an implementation, a background image displayed in the first display content page may be hidden or deleted, and then other icons displayed in the first display content page are scaled down and obscured at their respective initial position. The transparency of other regions except the region occupied by the target display icon may be increased in the first screen of display contents with alpha blending to implement the obscuring process, and thus other regions except the region occupied by the target display icon in the first display content page is obscured visually and the target display icon is highlighted.

Figure 11:
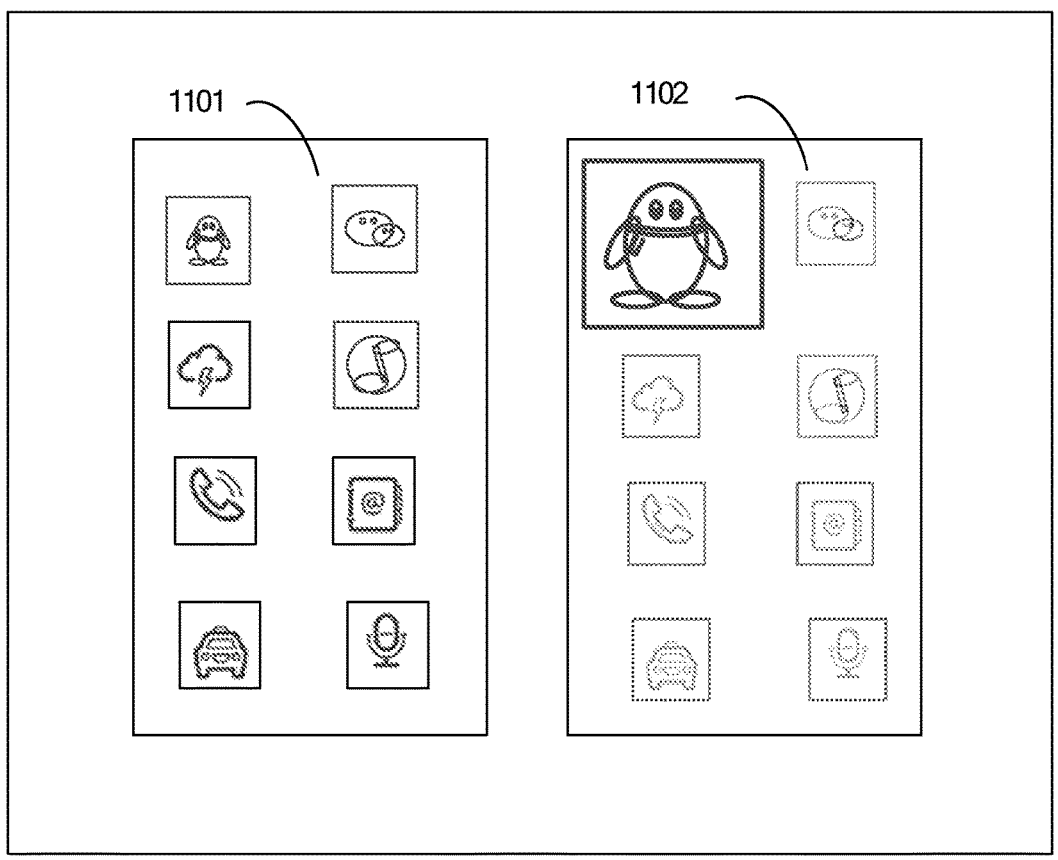
FIG. 11 is a schematic diagram of a first display content pages including the target display icon, where other icons expect the target display icon are obscured, in the icon display method according to the second embodiment of the disclosure.

As shown in FIG. 11, an initial display icon of the QQ application is shown, where the display position of the initial display icon is the first position in the first display content page. The initial state of the first display content page is shown in 1101 of FIG. 11. The electronic apparatus determines that the target application is the QQ application, and the display icon of the QQ application is enlarged to 200% of the initial display icon and displayed at the first position in the first display content page. Further, the electronic apparatus obscures other regions of the first display content page except the display icon of the QQ application. The processed display state of the first display content page is shown in 1102 of FIG. 11. The target display icon may be further highlighted by obscuring the first display content page which includes the target display icon corresponding to the target application. Thus, the user may find the position of the target display icon corresponding to the target application in the first display content page conveniently.

In step S703, the target application is invoked in response to the triggering operation.

Particularly, step S703 may be implemented in the following manner.

The electronic apparatus is switched to the first display state, and the first display content page including the target display icon is displayed in the first display interface. The target application is invoked in response to the triggering operation once the target display icon is displayed in the adjusted display state for a preset time period.

Particularly, in the embodiment, the electronic apparatus displays the global display contents on the second display interface. That is, icons corresponding to all of applications of the electronic apparatus are displayed on the second display interface. In this case, a triggering operation, such as a click operation or a press-down operation, for the target display icon of the target application displayed on the second display interface is detected. Then, the electronic apparatus adjusts the display state of the target display icon, and the electronic apparatus is switched to display the first display content page including the target display icon. That is, the first display content page including the adjusted target display icon is displayed on the first display interface. Further, the target display icon is displayed in the adjusted display state for a preset time period, and then the electronic apparatus invokes the target application in response to an instruction for invoking the target application.

For example, in a case that the electronic apparatus is in the global display state, the user clicks the display icon of the QQ application in the global display content page. Then, the electronic apparatus determines that the target application is the QQ application, enlarges the display icon of the QQ application in the first display content page, and adjusts the color and the display state of the display icon of the QQ application. Then, the display state of the electronic apparatus is switched from the global display state to the first display state in which the first display content page including the display icon of the QQ application is displayed. Since the electronic apparatus highlights the display icon of the QQ application, the user is easy to find the position of the display icon of the QQ application in the first display interface when the electronic apparatus is switched to display the first display content page. After the display icon of the QQ application is displayed in the adjusted display state for a preset time period, the electronic apparatus invokes the QQ application under the controlled in response to the triggering operation, and the functional interface of the QQ application is started, where the preset time period may be set to 3 seconds, 5 seconds or 10 seconds according to actual requirement, which will not be limited in the disclosure.

Of course, in the case that the electronic apparatus displays the first display content page on the first display interface, the electronic apparatus may also detect an triggering operation, such as a click operation or a press-down operation, on the target display icon corresponding to the target application displayed on the first display interface. In this case, the electronic apparatus may also invoke the target application in response to the triggering operation.

Third Embodiment

Figure 12:
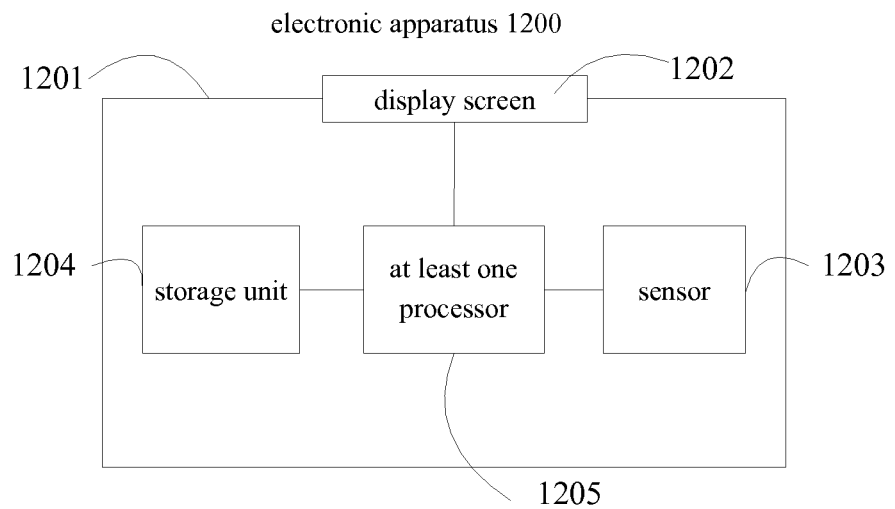
FIG. 12 is a schematic structural diagram of an electronic apparatus according to a third embodiment of the disclosure.

An electronic apparatus 1200 is provided according to an embodiment of the disclosure for implementing the icon display method according to the above first embodiment. As shown in FIG. 12, the electronic apparatus 1200 includes:
 a housing 1201;
 a display screen 1202 disposed at a first position of the housing 1201;
 a sensor 1203 disposed within the housing 1201;
 a memory 1204 disposed within the housing 1201 and configured to store at least one program module;
 at least one processor 1205 disposed within the housing 1201 and connected with the display screen 1202 and the sensor 1203, where the at least on processor 1205 is configured to:
 determine N icons having a one-to-one correspondence with N applications of the electronic apparatus, where N≥1, and each of the N icons has a first display parameter;
 control a display screen 1202 to display n icons, where 1<n<N, and an application corresponding to one of the n icons is invoked in response to a triggering operation of an operator;
 acquire a sensing parameter by the sensor 1203;
 determine whether the sensing parameter matches with a preset operation; and
 adjust first display parameters of m icons and display the m adjusted icons on the display screen 1202, in a case that the sensing parameter matches with the preset operation, where the m icons include the n icons; n<m≤N; and N, n and m each are integers. An application corresponding to one of the m icons is invoked in response to a triggering operation of an operator.

Optionally, the first display parameter is a size of an icon, and the at least one processor may be configured to:
 adjust each of the m icons from a first size to a second size, where the second size is smaller than the first size.

Particularly, according to an embodiment of the disclosure, the size of icons may be reduced to display more icons on the display screen of the electronic apparatus, and thus the user may find icons more conveniently. For example, as shown in 2a of FIG. 2, before the electronic apparatus determines that the preset operation is performed, icons of 4 applications, Phone, Message, WeChat and Weibo, are displayed on the display screen of the electronic apparatus, that is, n=4. The icons of the 4 applications are displayed on the display screen in a first size. As shown in 2b of FIG. 2, after the electronic apparatus determines that the preset operation is performed, icons of 6 applications, Phone, Message, WeChat, Weibo, Weather, Video, are displayed on the display screen of the electronic apparatus, that is, m=6. The icons of the 6 applications are scaled down from the first size to a second size. In this way, the display screen of the electronic apparatus may display more icons by reducing the size of icons, thus the icons may be displayed more intuitively thus the user may find icons more conveniently and usage efficiency of the electronic apparatus may be enhanced.

Optionally, the at least one processor may be further configured to:
 adjust a display distance between any two adjacent icons of the m icons from a first display distance to a second display distance, where the second display distance is shorter than the first display distance.

Particularly, the display distance between icons may be reduced to display more icons on the first display interface, and thus the user may find icons more conveniently. For example, as shown in 3a of FIG. 3, before the electronic apparatus determines that the preset operation is performed, 4 icons of applications, Phone, Message, WeChat and Weibo, are displayed on the display screen of the electronic apparatus, that is, n=4. The distance between any two adjacent icons of the 4 icons of applications is the first display distance. As shown in 3b of FIG. 3, after the electronic apparatus determines that the preset operation is performed, icons of 6 applications, Phone, Message, WeChat, Weibo, Whether, Video, are displayed on the display screen. The distance between any two adjacent icons of the 6 icons of applications is reduced from the first display distance to the second display distance. In this way, more icons may be displayed on the display screen of the electronic apparatus by reducing the display distance between icons, and thus the user may find icons conveniently.

Optionally, the at least one processor may be further configured to:
 determine whether the m icons include a folder; and
 in a case that the m icons include the folder, disable the folder, make the m icons include no the folder.

For example, as shown in 4a of FIG. 4, before the electronic apparatus determines that the preset operation is performed, a folder icon is displayed on the display screen of the electronic apparatus, the folder corresponding to the folder icon includes 4 icons of applications, Phone, Message, WeChat and Weibo. As shown in 4b of FIG. 4, after the electronic apparatus determines that the preset operation is performed, the electronic apparatus disable the folder, and thus all of the 4 icons of applications, Phone, Message, WeChat and Weibo, are displayed on the display screen directly. The user does not need to open the folder when looking for the icon. Thus, the icons may be found more conveniently.

It should be noted that, after the user finds the icon and triggers the application corresponding to the icon, the folder may be reenabled by the electronic apparatus. Alternatively, after the electronic apparatus displays the m adjusted icons on the display screen, the user may trigger the electronic apparatus to display the n icons on the display screen again, and the electronic apparatus may be reenable the folder simultaneously, therefore displaying the folder icon on the display screen.

Optionally, the at least one processor may be further configured to:
 order the m icons based on the second display parameters of the m icons, where the m icons have different second display parameters.

It should be noted that, when looking for an application on the display screen of the electronic apparatus, the user habitually looks for an application according to a color or a shape of the icon of the application. Thus, the second display parameter may be a color of a icon or a shape of a icon. In this case, according to the embodiment of the disclosure, the m icons may be ordered based on the different colors of the m icons or based on the different shapes of the m icons.

For example, the electronic apparatus may include applications with yellow icons such as BucaCartoon, Mail and Weibo, applications with green icons such as WeChat, Weather and Phone, applications with white icons such as Message, YiXin and Video. As shown in 5a of FIG. 5, before the electronic apparatus determines that the preset operation is performed, icons of 4 applications, Phone, Message, WeChat and Weibo, are displayed in sequence on the display screen of the electronic apparatus. As shown in 5b of FIG. 5, after the electronic apparatus determines that the preset operation is performed, 9 icons, Phone, message, WeChat, Weibo, Weather, Video, BucaCartoon, Mail and YiXin are ordered based on colors of icons. The yellow icons, corresponding to BucaCartoon, Mail and Weibo, are close to each other; the green icons, corresponding to WeChat, Weather, and Phone, are close to each other; and the white icons, corresponding to Message, YiXin and Video, are close to each other. Thus, icons are displayed more intuitively. In this way, when looking for Weibo, the user may look for the icon among yellow icons, so as to find the icon more conveniently.

Optionally, the at least one processor may be further configured to:
 hide display elements of m icons, where the display element may include a word of each of the m icons, and the word may include a name of the application corresponding to the icon.

Particularly, according to an embodiment of the disclosure, when the user looks for the application, in order to avoid disturbances from other elements other than icons on the display interface of the electronic apparatus, display elements other than icons on the display screen of the electronic apparatus may be hidden after the preset operation is performed.

For example, as shown in 6a of FIG. 6, before the electronic apparatus determines that the preset operation is performed, 4 applications, Phone, Message, WeChat and Weibo, are displayed on the display screen of the electronic apparatus. In addition, a wallpaper, application names corresponding to icons, and a search component for searching information are also displayed on the display screen. As shown in 6b of FIG. 6, after the electronic apparatus determines that the preset operation is performed, all of the wallpaper, the application names and the search component are hidden by the electronic apparatus, and only icons of applications are displayed on the display screen. Disturbances from irrelevant elements are avoided and icons may be displayed more intuitively, thus the user may find icons more conveniently.

Those skilled in the art should understand that, for convenience and brevity of description, the specific operation procedure and description of the above described electronic apparatus may be referred to the corresponding procedure in the first embodiment, which will be omitted herein.

With the above electronic apparatus, the electronic apparatus displays m icons including the n icons on the display screen after adjusting the first display parameter of icons, and thus the user may find other icons besides the n icons on the display screen. In this way, the user does not need to turn pages to find icons and usage efficiency of the electronic apparatus is enhanced.

Those skilled in the art should understand that embodiments of the disclosure may be provided as a method, a system or a computer program product. Therefore, the embodiments of the disclosure may be complete hardware-based, complete software-based or software-hardware combined. Furthermore, the embodiments of the disclosure may be in the form of computer program product implemented on one or more computer-available storage medium (including disc storage, CD-ROM, optical storage) having computer available program codes.

The disclosure is described in conjunction with flowcharts and/or block diagrams of the method, device (system) and computer program product according to the embodiments of the disclosure. It should be understood that each or any combination of flows and/or blocks in the flowcharts and/or block diagrams may be implemented with computer program instructions. The computer program instructions may be supplied to a processor of general-purpose computer, dedicated computer, embedded processor or other programmable data processing devices to generate a machine, so that an apparatus for implementing a function specified in one or multiple flows in the flowcharts and/or one or multiple blocks in the block diagrams may be generated with the instructions executed by the processor of computer or other programmable data processing devices.

The computer program instructions may also be stored in a computer readable storage which can instruct the computer or other programmable data processing devices to function in specific ways so that a product including an instruction apparatus is generated with the instructions stored in the computer readable storage. The function specified in one or multiple flows in the flowcharts and/or one or multiple blocks in the block diagrams is implemented with the instruction apparatus.

The computer program instructions may also loaded to the computer or other programmable data processing devices, so that a series of operation steps are performed on the computer or other programmable devices to generate computer-implemented processes. A step for implementing the function specified in one or multiple flows in the flowcharts and/or one or multiple blocks in the block diagrams is provided with the instructions executed on the computer or other programmable devices.

Particularly, the computer program instructions corresponding to the icon display method according to the embodiments of the disclosure may be stored in a storage medium such as an optical disk, a hard disk or a USB disk. When the computer program instructions corresponding to the icon display method stored in the storage medium are read or executed by an electronic apparatus, the following steps may be performed:

determining N icons displayed on a display screen of an electronic apparatus, where the N icons have a one-to-one correspondence with N applications of the electronic apparatus, where N≥1, and each of the N icons has a first display parameter;

controlling a display screen of the electronic apparatus to display n icons, where 1<n<N, and an application corresponding to one of the n icons is invoked in response to a triggering operation of an operator;

acquiring a sensing parameter by a sensor of the electronic apparatus;

determining whether the sensing parameter matches with a preset operation; and adjusting the first display parameter of m icons and displaying the m adjusted icons on the display screen 1202, in a case that the sensing parameter matches with the preset operation, where the m icons includes the n icons; n<m≤N; and N, n and m each are integers. An application corresponding to one of the m icons is invoked in response to a triggering operation of an operator.

Optionally, the first display parameter may be a size of an icon, and the adjusting first display parameters of m icons may include:

adjusting each of the m icons from a first size to a second size, where the second size is smaller than the first size.

Optionally, after the adjusting first display parameters of m icons, the method may further include:

adjusting a first display distance between any two adjacent icons of the m icons to a second display distance, where the second display distance is smaller than the first display distance.

Optionally, the adjusting first display parameters of m icons may include:

determining whether the m icons include a folder; and disabling the folder in a case that the m icons include the folder, make the m icons include no the folder.

Optionally, after the adjusting first display parameters of m icons, the method may further include:

ordering the m icons based on the second display parameters of the m icons, where the m icons have different second display parameters.

Optionally, after the adjusting first display parameters of m icons, the method may further include:

hiding display elements of m icons, where the display element may include a word of each of the m icons, and the word may include a name of the application corresponding to the icon.

Fourth Embodiment

Figure 13:
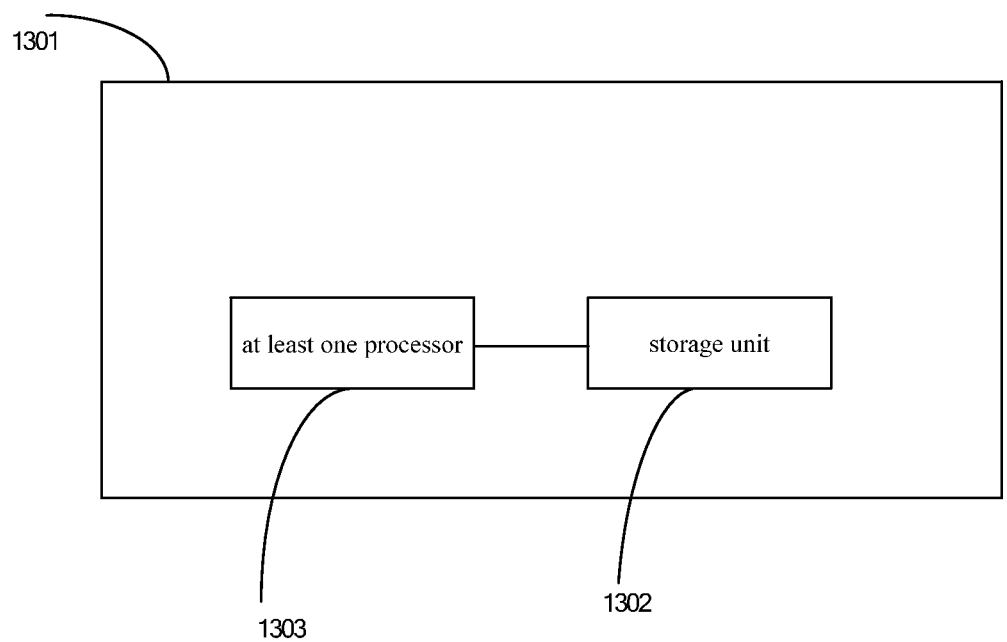
FIG. 13 is a schematic structural diagram of an electronic apparatus according to a fourth embodiment of the disclosure.

Referring to FIG. 13, an electronic apparatus is further provided according to an embodiment of the disclosure, which includes:

a housing 1301;

a memory 1302 disposed within the housing 1301 and configured to store at least one program module;

at least one processor 1303 disposed within the housing 1301, where the at least on processor 1205 is configured to:

acquire a triggering operation on a target display icon of a target application;

adjust a display state of the target display icon on a first display interface to prompt the user with the display position of the target display icon on a first display interface; and invoke the target application in response to the triggering operation.

Optionally, the at least one processor may be further configured to:

detect a triggering operation on a target display icon of the N icons displayed in a second display interface in a case that a display state of the N icons corresponding to N applications of the electronic apparatus is switched from a first display state to a second display state;

where in the first display state, the N icons are displayed in a first display interface which includes multiple display content pages, where each of the multiple display content pages includes at least one of the N icons, the total number of icons in the multiple display content pages is N, where N is an integer greater than or equal to 2; in the second display state, the N icons are displayed in the second display interface which includes single display content page, where the single one display content page includes the N icons, and an icon displayed on the first display interface has a different first display parameter from an icon displayed on the second display interface.

Optionally, the at least one processor may be further configured to:

enlarge the target display icon, where an area of a display region occupied by the enlarged target display icon is larger than an area of a display region occupied by an display icon corresponding to any one of other applications, in a first display content page including the target display icon; and the multiple display content pages include the first display content page.

Optionally, the at least one processor may be further configured to:

adjust a display color of the target display icon, where a color of the adjusted target display icon is different from a color of an icon corresponding to any one of other applications, in a first display content page including the target display icon; and the multiple display content pages include the first display content page.

Optionally, the at least one processor may be further configured to:

switch the target display icon to a blinking display state, where the adjusted target display icon has a display state different from an icon corresponding to any one of other applications, in a first display content page including the target display icon, and the multiple display content pages include the first display content page.

Optionally, the at least one processor may be further configured to:

determine a first display content page including the target display icon after a display state of the target display icon is adjusted on the first display interface; and obscure display contents except the target display icon in the first display content page.

Optionally, the at least one processor may be further configured to:

switch the electronic apparatus to the first display state, display the first display content page including the target display icon in the first display interface, and invoke a target application in response to the triggering operation after the target display icon is displayed in the adjusted display state for a preset time period.

Fifth Embodiment

Figure 14:
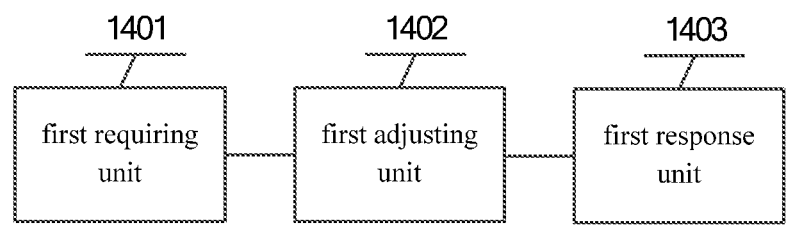
FIG. 14 is schematic structural diagram of an electronic apparatus according to a fifth embodiment of the disclosure.

As shown in FIG. 14, an electronic apparatus is provided according to an embodiment of the disclosure. The electronic apparatus includes:

a first acquiring unit 1401 configured to acquire an triggering operation on a target display icon of a target application;

a first adjusting unit 1402 configured to adjust a display state of the target display icon on a first display interface to prompt a user with a display position of the target display icon on a first display interface; and a first response unit 1403 configured to invoke the target application in response to the triggering operation.

Optionally, the first acquire unit 1401 may include:

a first acquire module configured to detect a triggering operation on a target display icon of the N icons displayed in a second display interface in a case that a display state of N icons corresponding to N applications of the electronic apparatus is switched from a first display state to a second display state;

where in the first display state, the N icons are displayed in a first display interface which includes multiple display content pages, where each of the multiple display content pages includes at least one of the N icons, the total number of icons in the multiple display content pages is N, where N is an integer greater than or equal to 2; in the second display state, the N icons are displayed in the second display interface which includes single display content page, where the single display content page includes the N icons, and an icon displayed on the first display interface has a different first display parameter from an icon displayed on the second display interface.

Optionally, the first adjust unit 1402 may include:

a first enlarge module configured to enlarge the target display icon, where an area of a display region occupied by the enlarged target display icon is larger than an area of a display region occupied by an display icon corresponding to any one of other applications, in a first display content page including the target display icon; and the multiple display content pages include the first display content page.

Optionally, the first adjust unit 1402 may include:

a first adjust module configured to adjust a display color of the target display icon, where a color of the adjusted target display icon is different from a color of an icon corresponding to any one of other applications, in a first display content page including the target display icon; and the multiple display content pages include the first display content page.

Optionally, the first adjust unit 1402 may include:

a first switch module configured to switch the target display icon to a blinking display state, where the adjusted target display icon has a different display state from an icon corresponding to any one of other applications, in a first display content page including the target display icon; and the multiple display content pages include the first display content page.

Optionally, the electronic apparatus may further include:

a second determine unit configured to determine the first display content page including the target display icon; and a first process unit configured to obscure display contents except the target display icon in the first display content page.

Optionally, the first response unit may include:

a first response module configured to switch the electronic apparatus to the first display state, display the first display content page including the target display icon in the first display interface, and invoke a target application in response to the triggering operation after the target display icon is displayed in the adjusted display state for a preset time period.

One or more of the following technical effects may be achieved with one or more of the technical solutions according to the embodiments of the disclosure.

1. The technical solution of the embodiments of the disclosure may be achieved by acquiring an triggering operation on a target display icon of a target application; adjusting a display state of the target display icon on a first display interface to prompt a user with a display position of the target display icon on the first display interface; and invoking the target application in response to the triggering operation. Therefore, after determining the target application to be invoked, the electronic apparatus may adjust the display state of the target display icon corresponding to the target application, to distinguish the icon of the target application from icons of other applications. In this way, the user may determine the position of the target display icon rapidly according to the state of the target display icon, and find the icon corresponding to the target application at the known position next time the target application needs to be invoked. Therefore, the application may be invoked rapidly. Therefore, the technical issue in the conventional art where a singular icon display mode of the electronic apparatus can not meet with the demands of the user may be solved. The technical effect of timely informing the user of the position of an icon of an application in the display screen may be achieved by changing the display state of the icon of the application.

2. The technical solution of the embodiments of the disclosure may be achieved by detecting and acquiring a triggering operation on a target display icon of the N icons displayed in a second display interface, in a case that N icons corresponding to N applications of the electronic apparatus is switched from a first display state to a second display state; where in the first display state, the M icons are displayed in a first display interface including multiple display content pages, where each of the multiple display content pages includes at least one of the icons, the total number of icons in the multiple display content pages is N, where N is an integer greater than or equal to 2; in the second display state, N icons are displayed in the second display interface including single display content page, where the single display content page includes the N icons, and the icon displayed on the first display interface has a different display parameter from the icon displayed on the second display interface. Therefore, the electronic apparatus may combine icons of all of the applications displayed in the multiple display content pages into one global display content page, and display the global display contents, when the user requires performing operations on the target application. The user does not need to look for the icon corresponding to the target application screen by screen in the electronic apparatus by a sliding operation, and may find the icon corresponding to the target application rapidly from the global display contents, thus meeting the demand of the user for invoking the application rapidly.

3. The technical solution of the embodiments of the disclosure may be achieved by switching the electronic apparatus to the first display state, displaying the first display content page including the target display icon in the first display interface, and invoking the target application in response to the triggering operation after the target display icon is displayed in the adjusted display state for a preset time period. Therefore, the electronic apparatus is switched from the second display state where icons of applications are display in the global display state to the state where the first display content page corresponding to the target display icon is displayed. Further, since the target display icon is displayed on the first display content page in a display state adjusted by the electronic apparatus, the user may timely know the first display content page including the target display icon and the position of the target display icon in the display screen. Further, the application corresponding to the target display icon may be invoked automatically by the electronic apparatus after the target display icon is displayed in the display state for a preset time period, thereby achieving the technical effect that the user may be intellectually prompted with the position where the icon of the target application locates and the target application may be invoked intellectually.

Those skilled in the art should understand that the embodiments of the disclosure may be provided as method, system or computer program product. Therefore, the embodiments of the disclosure may be complete hardware-based, complete software-based or software-hardware combined. Furthermore, the embodiments of the disclosure may be in the form of computer program product implemented on one or more computer-available storage medium (including disc storage, CD-ROM, optical storage) having computer available program codes.

The disclosure is described in conjunction with flowcharts and/or block diagrams of the method, device (system) and computer program product according to the embodiments of the disclosure. It is to be understood that each or any combination of flows and/or blocks in the flowcharts and/or block diagrams may be implemented with computer program instructions. The computer program instructions may be supplied to a processor of general-purpose computer, dedicated computer, embedded processor or other programmable data processing devices to generate a machine, so that apparatus for implementing function specified in one or multiple flows in the flowcharts and/or one or multiple blocks in the block diagrams may be generated with the instructions executed by the processor of computer or other programmable data processing devices.

The computer program instructions may also be stored in a computer readable storage which can instruct the computer or other programmable data processing devices to function in specific ways so that a product including an instruction apparatus is generated with the instructions stored in the computer readable storage. The function specified in one or multiple flows in the flowcharts and/or one or multiple blocks in the block diagrams is implemented with the instruction apparatus.

The computer program instructions may also loaded to the computer or other programmable data processing devices, so that a series of operation steps are performed on the computer or other programmable devices to generate computer-implemented processes. A step for implementing the function specified in one or multiple flows in the flowcharts and/or one or multiple blocks in the block diagrams is provided with the instructions executed on the computer or other programmable devices.

Particularly, the computer program instructions corresponding to the icon display method according to the embodiments of the disclosure may be stored in a storage medium such as an optical disk, a hard disk or a USB disk. When the computer program instructions corresponding to the icon display method stored in the storage medium are read or executed by an electronic apparatus, the following steps may be performed:

acquiring a triggering operation on a target display icon of a target application;

adjusting a display state of the target display icon on a first display interface to prompt a user with a display position of the target display icon on a first display interface; and invoking the target application in response to the triggering operation.

Optionally, the step, corresponding to the computer instruction stored in the storage medium, of acquiring an triggering operation on a target display icon of a target application, may include:

detecting a triggering operation on a target display icon of the N icons displayed in a second display interface in a case that a display state of N icons corresponding to N applications of the electronic apparatus is switched from a first display state to a second display state;

where in the first display state, the N icons are displayed in a first display interface which includes multiple display content pages, where each of the multiple display content pages includes at least one of the N icons, the total number of icons in the multiple display content pages is N, where N is an integer greater than or equal to 2; in the second display state, the N icons are displayed in the second display interface which includes single display content page, where the single display content page includes the N icons, and an icon displayed on the first display interface has a different first display parameter from an icon displayed on the second display interface.

Optionally, during the specific execution, the step, corresponding to the computer instruction stored in the storage medium, of adjusting a display state of the target display icon on a first display interface, may include:

enlarging the target display icon, where an area of a display region occupied by the adjusted target display icon is larger than an area of a display region occupied by an display icon corresponding to any one of other applications in a first display content page including the target display icon, and the multiple display content pages include the first display content page.

Optionally, during the execution, the step, corresponding to the computer instruction stored in the storage medium, of adjusting a display state of the target display icon on a first display interface, may include:

adjusting a display color of the target display icon, where a color of the adjusted target display icon is different from a color of an icon corresponding to any one of other applications, in a first display content page including the target display icon; and the multiple display content pages include the first display content page.

Optionally, during the execution, the step, corresponding to the computer instruction stored in the storage medium, of adjusting a display state of the target display icon on a first display interface, may include:

switching the target display icon to a blinking display state, where the adjusted target display icon has a different display state from an icon corresponding to any one of other applications, in a first display content page including the target display icon; and the multiple display content pages include the first display content page.

Optionally, after adjusting a display state of the target display icon on a first display interface, the step corresponding to the computer instruction stored in the storage medium may include:

determining the first display content page including the target display icon; and obscuring display contents except the target display icon in the first display content page.

Optionally, during the specific execution, the step, corresponding to the computer instruction stored in the storage medium, of invoking the target application in response to the triggering operation, may include the following step:

switch the electronic apparatus to the first display state, displaying the first display content page including the target display icon in the first display interface, and invoke a target application in response to the triggering operation after the target display icon is displayed in the adjusted display state for a preset time period.

Preferred embodiments of the disclosure have been described, while alterations and modifications may be made to the embodiments by those skilled in the art based on basic creative concepts of the disclosure. Therefore, appended claims are intended to include the preferred embodiments and all the alterations and modifications falling within the scope of protection of the disclosure.

Apparently, various modifications and variations may be made by those skilled in the art without deviating from the spirit and scope of the disclosure. Therefore, if the modifications and variations fall within the scope of the claims and equivalent techniques of the disclosure, the disclosure is intended to include the modifications and variations.

The invention claimed is:

1. A method for displaying icons on a display screen of an electronic apparatus, comprising:

displaying, by the electronic apparatus comprising the display screen and a sensor, N icons on the display screen of the electronic apparatus in a first display state, wherein the N icons have a one-to-one correspondence with N applications of the electronic apparatus, where N≥1, each of the N icons has a first display parameter, and wherein in the first display state, the N icons are displayed in a first display interface which comprises a plurality of display content pages, and each of the plurality of display content pages comprises at least one of the N icons;

acquiring a sensing parameter by the sensor of the electronic apparatus;

determining, by the electronic apparatus, whether the sensing parameter matches with a preset operation;

adjusting, by the electronic apparatus, the first display parameters of m icons selected from the N icons, where m≤N;

ordering the m icons based on different colors of the m icons or based on different shapes of the m icons;

switching, by the electronic apparatus, a display state of the N icons from the first display state to a second display state, in response to the sensing parameter matching with the preset operation, wherein in the second display state, the N icons are displayed in a second display interface which comprises single display content page, and the single display content page comprises the N icons;

detecting, by the electronic apparatus, a triggering operation on a target display icon of the N icons in the second display state;

switching, by the electronic apparatus, the display state of the N icons from the second display state back to the first display state in response to the detected triggering operation;

displaying, by the electronic apparatus, a first display content page comprising the target display icon with changed display state in the first display interface for a preset time period in response to switching the display state of the N icons from the second display state back to the first display state; and invoking, by the electronic apparatus, a target application corresponding to the target display icon after the first display content page is displayed for the preset time period.

2. The method according to claim 1, further comprising:
displaying the adjusted m icons on the display screen.

3. The method according to claim 2, wherein the first display parameter is a size of an icon, and the adjusting the first display parameters of the m icons comprises:
adjusting each of the m icons from a first size to a second size, wherein the second size is smaller than the first size.

4. The method according to claim 3, wherein after adjusting the first display parameters of them icons, the method further comprises:
adjusting a display distance between any two adjacent icons of the m icons from a first display distance to a second display distance, wherein the second display distance is shorter than the first display distance.

5. The method according to claim 2, wherein adjusting the first display parameters of the m icons comprises:
determining whether the m icons comprise a folder; and
disabling the folder and displaying icons corresponding to applications in the folder on the display screen, in a case that the m icons comprise the folder.

6. The method according to claim 1,
wherein, a total number of icons in the plurality of display content pages is N, where N is an integer greater than or equal to 2 and an icon displayed in the first display interface has a display parameter different from an icon displayed in the second display interface.

7. The method according to claim 6, further comprising:
enlarging the target display icon, wherein an area of a display region occupied by the enlarged target display icon is larger than an area of a display region occupied by a display icon corresponding to any one of other applications in the first display content page comprising the target display icon; and the plurality of display content pages comprise the first display content page.

8. The method according to claim 6, further comprising:
adjusting a display color of the target display icon, wherein a color of the adjusted target display icon is different from a color of an icon corresponding to any one of other applications in the first display content page comprising the target display icon; and the plurality of display content pages comprise the first display content page.

9. The method according to claim 6, further comprising:
switching the target display icon to a blinking display state, wherein the switched target display icon has a display state different from an icon corresponding to any one of other applications in the first display content page comprising the target display icon, and the plurality of display content pages comprise the first display content page.

10. The method according to claim 6, further comprising:
determining the first display content page comprising the target display icon, and
obscuring display contents except the target display icon in the first display content page.

11. An electronic apparatus, comprising:
a housing;
a display screen disposed at a first position of the housing;
a sensor;
a memory configured to store at least one program module;

at least one processor connected with the display screen and the sensor, wherein the at least one processor executes the at least one program module to configure the apparatus to:
display N icons on the display screen of the electronic apparatus in a first display state, wherein the N icons have a one-to-one correspondence with N applications of the electronic apparatus, where N≥1, each of the N icons has a first display parameter, and wherein in the first display state, the N icons are displayed in a first display interface which comprises a plurality of display content pages, and each of the plurality of display content pages comprises at least one of the N icons;
determine whether a sensing parameter acquired by the sensor matches with a preset operation;
adjust the first display parameters of m icons selected from the N icons, where m≤N;
order the m icons based on different colors of the m icons or based on different shapes of the m icons;
switch a display state of the N icons from the first display state to a second display state in response to the sensing parameter matching with the preset operation, wherein in the second display state, the N icons are displayed in a second display interface which comprises single display content page, and the single display content page comprises the N icons;
detect a triggering operation on a target display icon of the N icons in the second display state;
switch the display state of the N icons from the second display state back to the first display state in response to the detected triggering operation;
display a first display content page comprising the target display icon with changed display state in the first display interface for a preset time period in response to switching the display state of the N icons from the second display state back to the first display state; and
invoke a target application corresponding to the target display icon after the first display content page is displayed for the preset time period.

12. The electronic apparatus according to claim 11, wherein the apparatus is further configured to:
display the adjusted m icons on the display screen.

13. The electronic apparatus according to claim 12, wherein the first display parameter is a size of an icon, and the apparatus is configured to:
adjust each of the m icons from a first size to a second size, wherein the second size is smaller than the first size.

14. The electronic apparatus according to claim 13, wherein the apparatus is further configured to:
adjust a display distance between any two adjacent icons of the m icons from a first display distance to a second display distance, wherein the second display distance is shorter than the first display distance.

15. The electronic apparatus according to claim 12, wherein apparatus is further configured to:
determine whether the m icons comprise a folder; and
disable the folder, and display icons corresponding to applications in the folder on the display screen, in a case that the m icons comprise the folder.

16. The electronic apparatus according to claim 11, wherein, a total number of icons in the plurality of display content pages is N, where N is an integer greater than or equal to 2 and an icon displayed on the first display interface has a display parameter different from an icon displayed on the second display interface.

17. The electronic apparatus according to claim 11, wherein the apparatus is further configured to:
  enlarge the target display icon, wherein an area of a display region occupied by the enlarged target display icon is larger than an area of a display region occupied by an display icon corresponding to any one of other applications, in the first display content page comprising the target display icon; and the plurality of display content pages comprise the first display content page.

18. The electronic apparatus according to claim 11, wherein the apparatus is further configured to:
  adjust a display color of the target display icon, wherein a color of the adjusted target display icon is different from a color of an icon corresponding to any one of other applications in the first display content page comprising the target display icon; and the plurality of display content pages comprise the first display content page.

19. The electronic apparatus according to claim 11, wherein the apparatus is further configured to:
  switch the target display icon to a blinking display state, wherein the switched target display icon has a display state different from an icon corresponding to any one of other applications in the first display content page comprising the target display icon, and the plurality of display content pages comprise the first display content page.

20. The electronic apparatus according to claim 11, wherein, the apparatus is further configured to:
  determine the first display content page comprising the target display icon, and
  obscure display contents except the target display icon in the first display content page.

* * * * *